Jan. 6, 1959
B. M. EWING
2,867,133
SELF-LOCKING CONTROL DEVICE
Filed Feb. 17, 1954
2 Sheets-Sheet 1
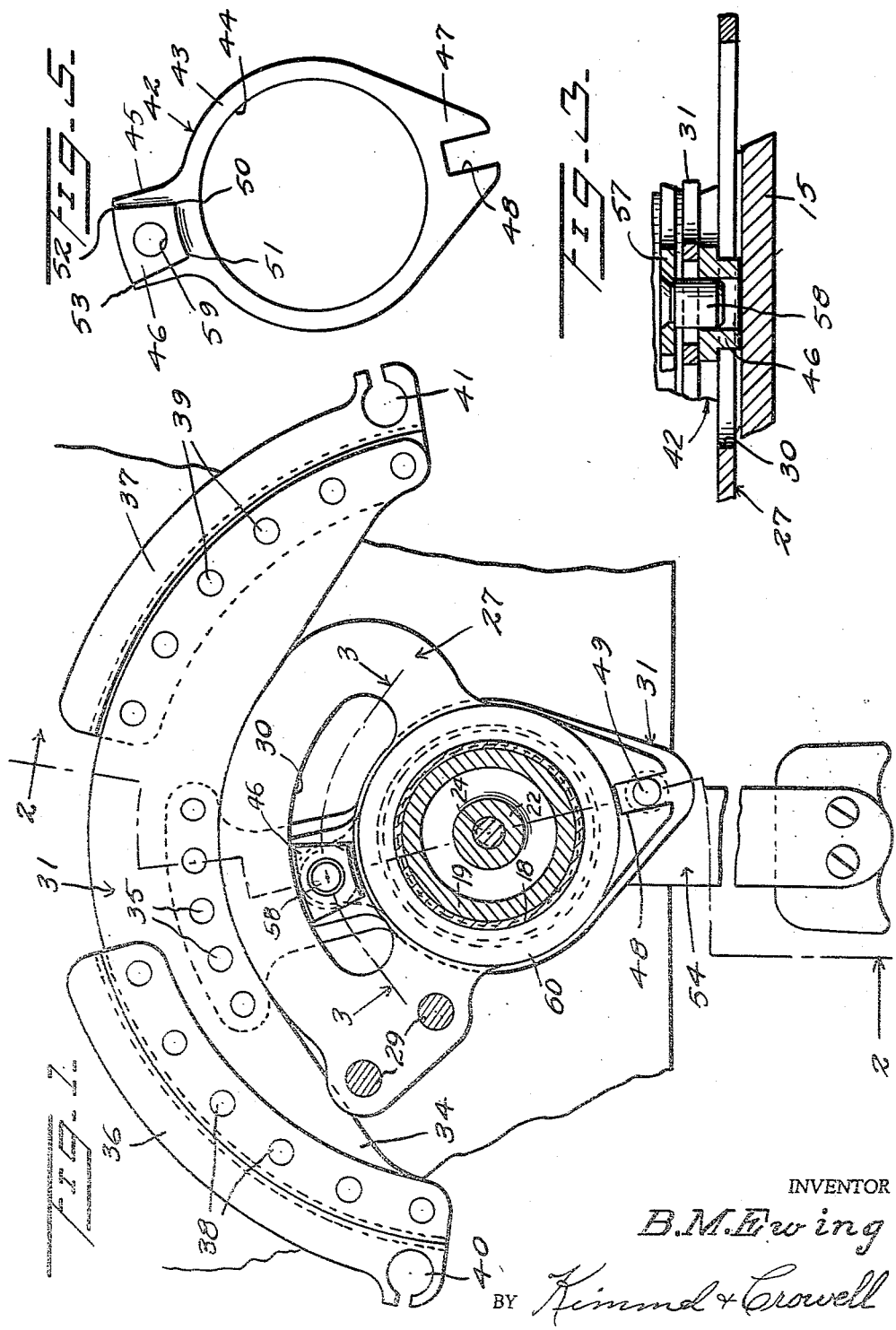
INVENTOR
B. M. Ewing
BY Kimmel & Crowell
ATTORNEYS Jan. 6, 1959  B. M. EWING  2,867,133
SELF-LOCKING CONTROL DEVICE
Filed Feb. 17, 1954  2 Sheets-Sheet 2
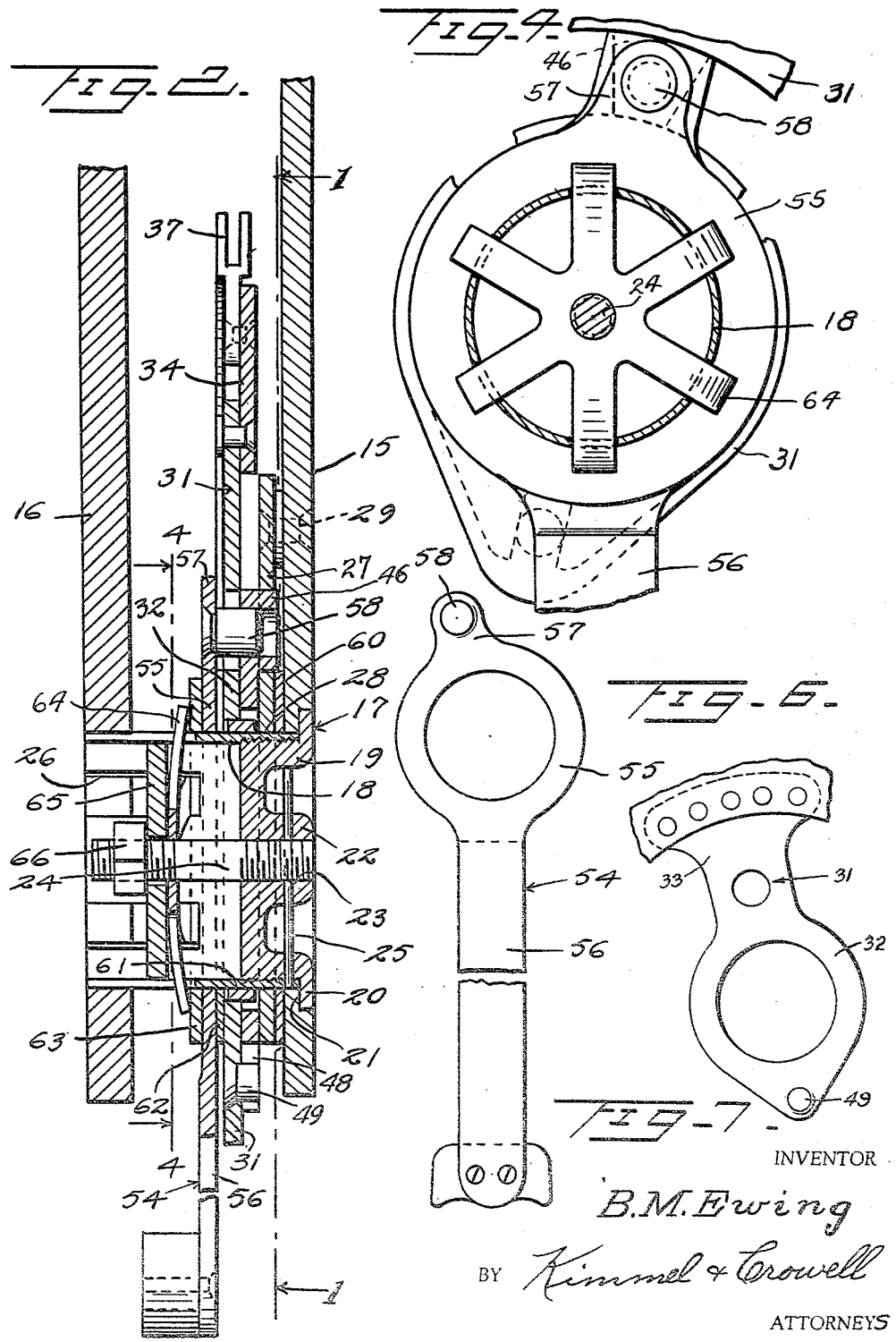
INVENTOR
B. M. Ewing
BY Kimmel & Crowell
ATTORNEYS United States Patent Office 2,867,133
Patented Jan. 6, 1959

2,867,133

SELF-LOCKING CONTROL DEVICE

Benton M. Ewing, Farmingdale, N. Y.

Application February 17, 1954, Serial No. 410,831

2 Claims. (Cl. 74—531)

This invention relates to an irreversible anti-creep locking means associated with a driving and a driven element.

An object of this invention is to provide an anti-creep means associated with a driving and driven means, whereby the driven means will be locked against movement so long as the driving means is stationary.

Another object of this invention is to provide an anti-creep means wherein the locking force is proportionate to the motive force exerted on the driven means.

A further object of this invention is to provide an anti-creep means which may be used in throttle quadrants of aircraft, super-charger controls, propeller controls, mixture controls, trim tab controls, canopy releases and the like. The anti-creep means may also be used in marine throttle controls, railroad air conditioning controls, farm equipment power plant controls and the like.

A further object of this invention is to provide an anti-creep means which is automatic in operation and will effectively lock a driven element until the driving element is moved or operated.

With the above and other objects in view, my invention consists in the arrangement, combination and details of construction disclosed in the drawings and specification, and then more particularly pointed out in the appended claims.

In the drawings:

Figure 1 is a vertical section taken substantially on the line 1—1 of Figure 2 of a self-locking control device constructed according to an embodiment of this invention.

Figure 2 is a sectional view taken on the line 2—2 of Figure 1.

Figure 3 is a fragmentary sectional view taken on the line 3—3 of Figure 1.

Figure 4 is a fragmentary sectional view taken on the line 4—4 of Figure 2.

Figure 5 is a side elevation of the locking element.

Figure 6 is a side elevation, partly broken away, of the driving member.

Figure 7 is a fragmentary side elevation of the driven member.

Referring to the drawings, the numerals 15 and 16 designate generally a pair of spaced apart supporting members, and the numeral 17 designates generally a stationary pivot extending between the supporting members 15 and 16.

The pivot 17 is constructed in the form of a tubular pivot member 18 having a flanged body 19 threaded into one end thereof, with the flange 20 seating in an annular recess 21 formed in the supporting member 15. The plug or flanged member 19 is provided with a central boss 22 having a threaded opening 23 within which a bolt 24 is threaded and secured by means of a pin 25.

The tubular pivot member 18 is provided with a plurality of elongated slots 26, the purpose for which will be hereinafter described.

A keeper plate 27 is formed with an opening 28 through which the pivot member 18 engages, and the keeper plate 27 is secured to the support 15 by fastening members 29. The keeper plate 27 is formed with an arcuate keeper opening or slot 30, the purpose for which will be hereinafter described.

A driven member, generally indicated at 31, is rotatably mounted on the pivot member 18, and is formed with a ring-shaped hub 32 loosely mounted on the pivot member 18. The driven member 31 includes a radially disposed arm 33 extending from the hub 32 with an arcuate plate 34 secured to the arm 33 by fastening means 35.

A pair of elongated channel members 36 and 37 are secured by fastening means 38 and 39 to the plate 34 with the inner ends of the channel members 36 and 37 spaced apart, as shown in Figure 1.

The terminal or outer ends of the channel members 36 and 37 are provided with keepers 40 and 41 respectively, for receiving a headed element secured to a flexible member for fixing an end of each flexible member to a channel member.

A locking member, generally indicated at 42, is loosely mounted on the pivot 18 between the driven member 31 and the keeper 27. The locking member 42 includes a ring or hub 43 having an interior diameter 44 sufficiently greater in diameter than the exterior diameter of pivot 18 so that the locking member 42 may have relatively lateral or radial movement with respect to the pivot member 18.

A radially projecting arm 45 extends from the hub 42 and a wedge-shaped locking bolt 46 is fixedly carried by the arm 45 and loosely engages in the keeper opening 30. The locking member 42 also includes a projection 47 diametrically opposite the arm 45 which is formed with an inwardly projecting radial slot 48 within which a pin 49, carried by driven member 31, loosely engages.

A rotative force exerted on driven member 31 by either flexible member engaging in the channels 36 or 37 will cause a rotative force to be applied from pin 49 to locking member 42, and this force will effect a rocking of locking member 42 sufficiently, due to the larger interior diameter of hub 43, so that one or the other of the corners 50 or 51 on the iner end of wedge member 46 will bite into the inner edge of keeper opening 30, and at the same time one of the outer corners 52 or 53 of locking member 46 will bear against the outer edge keeper opening 30.

In practice, the outer corners 52 and 53 will form fulcrums about which the locking member or bolt 46 will have slight rocking movement so that a diagonally opposite corner, such as 50 or 51, will bite into the adjacent inner convex edge of arcuate keeper opening 30. The driven member 31 may be freely rotated about the pivot member 18 by means of a driving member or element, generally indicated at 54.

The driving member 54 includes a circular hub 55 loosely engaging about the pivot member 18 and also includes an elongated lever or handle 56. A radially projecting arm 57 extends from the hub 55, and arm 57 has secured thereto a pin 58. The pin 58 loosely engages in an opening 59 formed through the arm 45 into locking member 46.

In mounting the assembly on the pivot member 18 between the supporting members 15 and 16, a washer 60 is interposed between keeper plate 27 and the adjacent face of support 15.

A ring 61 engages loosely within the inner diameter of hub 43 of locking member 42 and engages within the interior of hub 32 of driven member 31. A washer 62 is interposed between hub 32 and hub 55 of driving member 54.

An inner washer 63 is interposed between adjacent inner face of hub 55 and the arms of a spring-pressure member 64 which is mounted on bolt 24.

A plate 65 is mounted on bolt 24 and a spring tensioning nut 66 is threaded on bolt 24 and is adapted to press the several elements of the device together with the radial arms 64 loosely engaging through the slots 26 of pivot member 18.

In the use and operation of the invention, the driven member 31 is connected by flexible means, or the like, to an element which is to be adjusted, and against which force may be applied whereby driven member 31 will be urged to rock either clockwise or counterclockwise on pivot member 18.

When it is desired to adjust driven member 31, driving member 54 is swung about pivot member 18 thereby moving therewith locking member 42 and driven member 31. At this time, the force applied to locking member 42 through pin 58 will move locking member 42 in a concentric direction about pivot 18 thereby holding locking member 42 against rocking with respect to pivot 18.

In the event a counterforce is applied to driven member 31, this force will be transmitted through pin 49 to locking member 42 and cause locking member 42 to move laterally with respect to pivot 18.

This lateral movement of locking member 42 will cause one of the outer corners 52 or 53 of bolt 46 to bear against the outer concave edge of keeper opening 30, and the diagonally opposite corners 50 or 51 will bite into convex inner edge of keeper opening 30. In this manner locking member 42 will be locked relative to the stationary keeper member 27, and at the same time driven member 31 will be held against rotation about the pivot 18.

What is claimed is:

1. An anti-creep means comprising a supporting member, a pivot on said supporting member, a driven member rotatably carried by said pivot, a driving member rotatably carried by said pivot, a stationary arcuate keeper fixed relative to said supporting means and having an arcuate segmental slot formed therein, a locking member loosely carried by said pivot and having a portion engaging in said arcuate slot in said keeper, interengaging means carried by said driven member and said locking member for effecting locking engagement of said portion of said locking member with the edges of said arcuate slot of said keeper, and release means carried by said driving member engaging said locking member for releasing the locking engagement of said portion of the latter from said arcuate slot of said keeper.

2. An anti-creep means comprising a stationary pivot, a driven member formed with a hub loosely engaging said pivot, a driving member formed with a hub loosely engaging said pivot, a stationary keeper plate having an arcuate keeper opening concentric to said pivot, a locking member formed of a hub loose on said pivot, a wedge-shaped lock fixed to said latter named hub and loosely engaging in said keeper opening, a projection extending from said latter named hub opposite from said lock and formed with a slot radial to said pivot, a pin carried by said driven member engaging in said slot, a pin carried by said driving member engaging through said lock, rotative force applied to said driven member effecting rocking of said locking member about said second named pin whereby to wedge said lock in said keeper opening and hold said driven member against rotation on said pivot.

References Cited in the file of this patent
UNITED STATES PATENTS

| | | |
|---|---|---|
| 266,224 | Trammell | Oct. 17, 1882 |
| 1,797,148 | Jaggar | Mar. 17, 1931 |
| 2,169,888 | Snell | Aug. 15, 1939 |
| 2,458,446 | Suska | Jan. 4, 1949 |